(12) United States Patent
Chang et al.

(10) Patent No.: US 11,474,223 B1
(45) Date of Patent: Oct. 18, 2022

(54) TEMPERATURE-MEASURING DEVICE FOR DETECTING MOVING OBJECT TRAJECTORIES

(71) Applicant: RADIANT INNOVATION INC., Hsinchu County (TW)

(72) Inventors: Yung-Chang Chang, Hsinchu County (TW); Feng-Lien Huang, Hsinchu (TW)

(73) Assignee: RADIANT INNOVATION INC., Hsinchu County (TW)

( * ) Notice: Subject to any disclaimer, the term of this patent is extended or adjusted under 35 U.S.C. 154(b) by 0 days.

(21) Appl. No.: 17/459,585

(22) Filed: Aug. 27, 2021

(51) Int. Cl.
*G08B 21/00* (2006.01)
*G01S 11/12* (2006.01)
*G08B 21/18* (2006.01)
*G01P 13/00* (2006.01)

(52) U.S. Cl.
CPC .............. *G01S 11/12* (2013.01); *G01P 13/00* (2013.01); *G08B 21/18* (2013.01)

(58) Field of Classification Search
CPC ......... G01S 11/12; G01P 13/00; G08B 21/18; G01K 13/04
See application file for complete search history.

(56) References Cited

U.S. PATENT DOCUMENTS

| 9,424,734 | B1 * | 8/2016 | Hagi | G08B 21/22 |
| 10,909,835 | B1 * | 2/2021 | Singh | G01J 5/0806 |
| 10,948,287 | B1 * | 3/2021 | Grant | G01P 13/00 |
| 2015/0069245 | A1 * | 3/2015 | Nagahisa | G01V 8/10 |
| | | | | 250/340 |
| 2021/0335120 | A1 * | 10/2021 | Mamishev | G08B 21/22 |
| 2022/0015644 | A1 * | 1/2022 | Markov | A61B 5/7203 |

* cited by examiner

*Primary Examiner* — Toan N Pham
(74) *Attorney, Agent, or Firm* — Li & Cai Intellectual Property (USA) Office

(57) ABSTRACT

A temperature-measuring device for detecting moving object trajectories is provided. The temperature-measuring device includes a signal control module, a temperature-sensing module and a motion detection module. The temperature-sensing module is electrically connected to the signal control module, for measuring a temperature of each of a plurality of moving objects in an object temperature-measuring range. The motion detection module is electrically connected to the signal control module, for capturing a motion trajectory of each of the moving objects in an object motion detection range. The object temperature-measuring range is smaller than or equal to the object motion detection range, and the object temperature-measuring range falls entirely within the object motion detection range. The temperature-sensing module can be configured to respectively measure the temperatures of the moving objects in the object temperature-measuring range according to the motion trajectories of the moving objects that are provided by the motion detection module.

10 Claims, 4 Drawing Sheets

TEMPERATURE-MEASURING DEVICE FOR DETECTING MOVING OBJECT TRAJECTORIES

FIELD OF THE DISCLOSURE

The present disclosure relates to a temperature-measuring device, and more particularly to a temperature-measuring device having a function for detecting moving object trajectories.

BACKGROUND OF THE DISCLOSURE

In the related art, a conventional temperature measurement device has been widely used for measuring temperature. However, the conventional temperature measurement device cannot detect a human motion trajectory during temperature measurement, thus leaving room for improvement in the temperature measurement device.

SUMMARY OF THE DISCLOSURE

In response to the above-referenced technical inadequacy, the present disclosure provides a temperature-measuring device for detecting moving object trajectories.

In one aspect, the present disclosure provides a temperature-measuring device for detecting moving object trajectories, which includes a device main body, a signal control module, a temperature-sensing module and a motion detection module. The signal control module is disposed on the device main body. The temperature-sensing module is disposed on the device main body and electrically connected to the signal control module, for measuring a temperature of each of a plurality of moving objects in an object temperature-measuring range. The motion detection module is disposed on the device main body and electrically connected to the signal control module, for capturing a motion trajectory of each of the moving objects and a social distance of each of the moving objects from an adjacent one of the moving objects in an object motion detection range. The object temperature-measuring range is smaller than or equal to the object motion detection range, and the object temperature-measuring range falls entirely within the object motion detection range.

In another aspect, the present disclosure provides a temperature-measuring device for detecting moving object trajectories, which includes a signal control module, a temperature-sensing module and a motion detection module. The temperature-sensing module is electrically connected to the signal control module, for measuring a temperature of each of a plurality of moving objects in an object temperature-measuring range. The motion detection module is electrically connected to the signal control module, for capturing a motion trajectory of each of the moving objects in an object motion detection range. The object temperature-measuring range is smaller than or equal to the object motion detection range, and the object temperature-measuring range falls entirely within the object motion detection range.

In yet another aspect, the present disclosure provides a temperature-measuring device for detecting moving object trajectories, which includes a device main body, a signal control module, a temperature-sensing module, a motion detection module, an alarm-reporting module, an image-capturing module, an information-recording module and a time-counting module. The signal control module is disposed on the device main body. The temperature-sensing module is disposed on the device main body and electrically connected to the signal control module, for measuring a temperature of each of a plurality of moving objects in an object temperature-measuring range. The motion detection module is disposed on the device main body and electrically connected to the signal control module, for capturing a motion trajectory of each of the moving objects and a social distance of each of the moving objects from an adjacent one of the moving objects in an object motion detection range. The alarm-reporting module is disposed on the device main body and electrically connected to the signal control module, for generating an alarm signal. The image-capturing module is disposed on the device main body and electrically connected to the signal control module, for capturing image information of each of the moving objects. The information-recording module is disposed on the device main body and electrically connected to the signal control module, for recording object-related information of each of the moving objects. The time-counting module is disposed on the device main body and electrically connected to the signal control module, for calculating a stay time of each of the moving objects in the object motion detection range. The object temperature-measuring range is smaller than or equal to the object motion detection range, and the object temperature-measuring range falls entirely within the object motion detection range.

Therefore, in the temperature-measuring device provided by the present disclosure, by virtue of "the temperature-sensing module being electrically connected to the signal control module for measuring a temperature of each of a plurality of moving objects in an object temperature-measuring range", "the motion detection module being electrically connected to the signal control module for capturing a motion trajectory (or a motion trajectory and a social distance) of each of the moving objects in an object motion detection range" and "the object temperature-measuring range being smaller than or equal to the object motion detection range, and the object temperature-measuring range falling entirely within the object motion detection range", the temperature-sensing module can be configured to respectively measure the temperatures of all of the moving objects in the object temperature-measuring range according to information of the motion trajectories of the moving objects (or information of the motion trajectories and the social distances of the moving objects) that are provided by the motion detection module.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
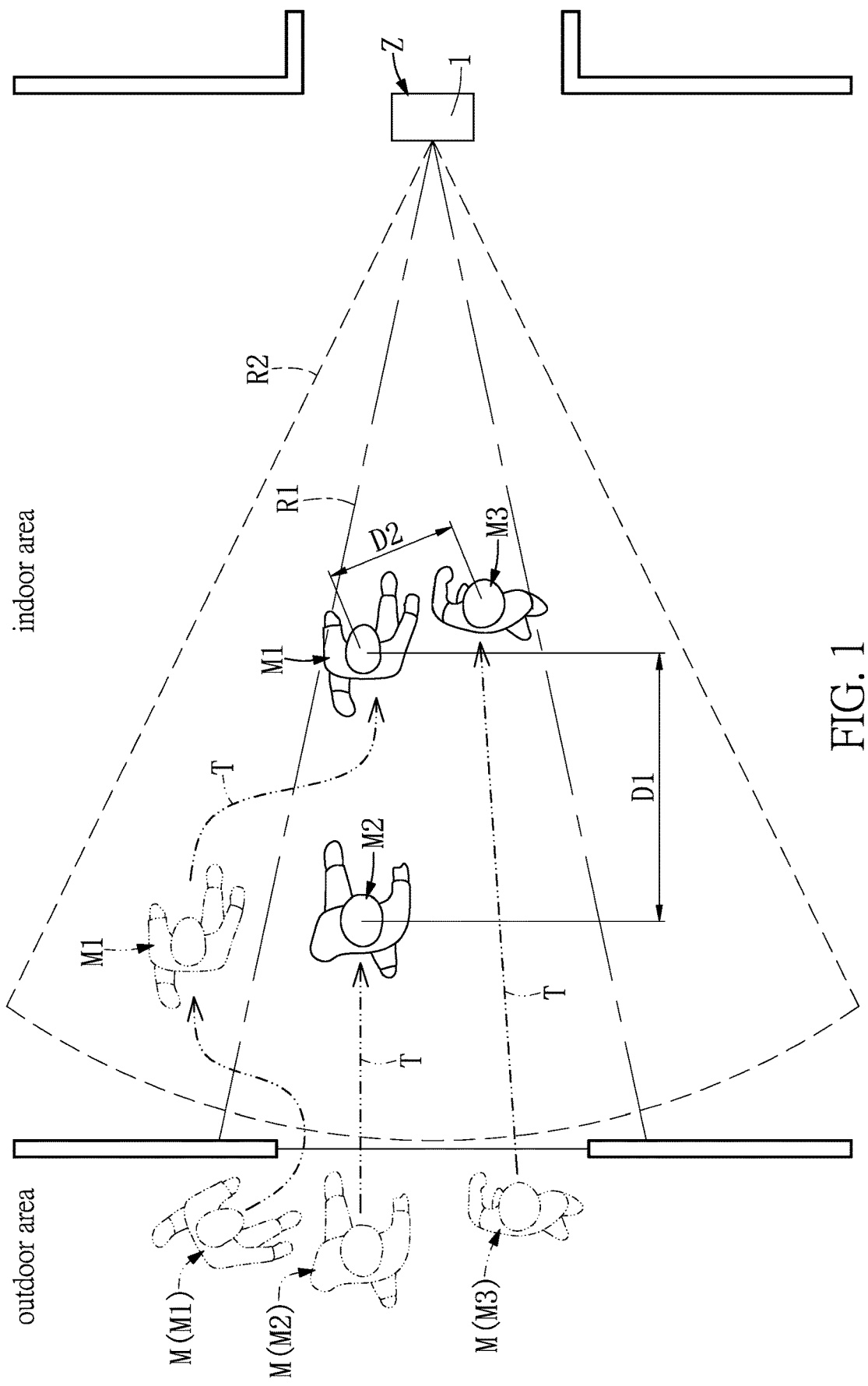
FIG. 1 is a schematic side view of a temperature-measuring device for measuring a temperature of each of a plurality of moving objects according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 6, the present disclosure provides a temperature-measuring device Z for detecting moving object trajectories, which includes a signal control module 2, a temperature-sensing module 3 and a motion detection module 4. The temperature-sensing module 3 is electrically connected to the signal control module 2 for measuring a temperature of each of a plurality of moving objects M in an object temperature-measuring range R1. The motion detection module 4 is electrically connected to the signal control module 2 for capturing (or tracking) a motion trajectory T (or a moving footprint) of each of the moving objects M in an object motion detection range R2. It should be noted that the object temperature-measuring range R1 falls entirely within the object motion detection range R2 (or the object motion detection range R2 completely encompasses the object temperature-measuring range R1), and the temperature-sensing module 3 can be configured to respectively measure the temperatures of all of the moving objects M in the object temperature-measuring range R1 according to information of the motion trajectories T of all of the moving objects M that are provided by the motion detection module 4.

First Embodiment

Figure 2:
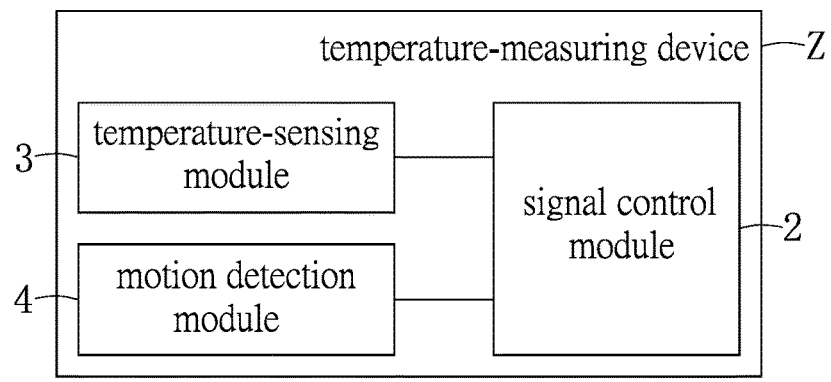
FIG. 2 is a functional block diagram of a temperature-measuring device for detecting moving object trajectories according to a first embodiment of the present disclosure.

Referring to FIG. 1 and FIG. 2, a first embodiment of the present disclosure provides a temperature-measuring device Z for detecting moving object trajectories, which includes a device main body 1, a signal control module 2, a temperature-sensing module 3 and a motion detection module 4.

More particularly, referring to FIG. 1 and FIG. 2, the signal control module 2 is disposed on the device main body 1. The temperature-sensing module 3 is disposed on the device main body 1 (or inside the device main body 1) and electrically connected to the signal control module 2, for measuring a temperature of each of a plurality of moving objects M in an object temperature-measuring range R1. The motion detection module 4 is disposed on the device main body 1 and electrically connected to the signal control module 2, for capturing a motion trajectory T of each of the moving objects M in an object motion detection range R2, and for capturing a social distance D of each of the moving objects M from an adjacent one of the moving objects M in the object motion detection range R2. It should be noted that the object temperature-measuring range R1 can be smaller than or equal to the object motion detection range R2, and the object temperature-measuring range R1 can fall entirely within the object motion detection range R2.

For example, the device main body 1 can include a casing structure (not shown in the drawings) and a circuit substrate (not shown in the drawings) disposed inside the casing structure. In addition, the temperature-sensing module 3 can be a non-contact temperature sensor for sensing a thermal radiation source, and the motion detection module 4 can be a radar detector (such as a millimeter-wave radar, an ultrasonic radar, an infrared radar or a laser radar) for capturing the motion trajectory T and the social distance D of each of the moving objects M. It should be noted that the moving object M can be a human or other animals (e.g., a pet). However, the aforementioned description is merely an example, and is not meant to limit the scope of the present disclosure.

For example, referring to FIG. 1 and FIG. 2, when the motion trajectory T of the moving object M1 is in the object temperature-measuring range R1 (such as a final position of the motion trajectory T of the moving object M1 as shown in FIG. 1), and the social distance D1 of the moving object M1 from the adjacent moving object M2 (i.e., the social distance D1 ranging from the moving object M1 to the adjacent moving object M2) is greater than or equal to a predetermined distance setting value (under the premise that the moving object M3 is omitted), the temperature-sensing module 3 can be configured to measure the temperature of the moving object M1 in the object temperature-measuring range R1 so as to obtain a measured object temperature (i.e., an estimated temperature obtained by measuring), and the measured object temperature that is captured from the moving object M1 is substantially close to an actual object temperature of the moving object M1 (i.e., an actual temperature of the moving object MD. It should be noted that the predetermined distance setting value is a separation distance for preventing the actual object temperature of the moving object M1 from being affected by an actual object temperature (i.e., a real temperature) of the adjacent moving object M2. That is to say, as shown in FIG. 1, when the social distance D1 from the moving object M1 to the adjacent moving object M2 is greater than or equal to the predetermined distance setting value (under the premise that the moving object M3 is omitted), the actual object temperature of the moving object M1 cannot be affected by the actual object temperature of the adjacent moving object M2, so that the measured object temperature that is captured from the moving object M1 is substantially close to the actual object temperature of the moving object M1. However, the aforementioned description is merely an example, and is not meant to limit the scope of the present disclosure.

For example, referring to FIG. 1 and FIG. 2, when the motion trajectory T of the moving object M1 is in the object temperature-measuring range R1 (such as a final position of the motion trajectory T of the moving object M1 as shown in FIG. 1), and the social distance D2 of the moving object M1 from the adjacent moving object M3 (i.e., the social distance D2 ranging from the moving object M1 to the adjacent moving object M3) is smaller a predetermined distance setting value, the temperature-sensing module 3 can be configured to measure the temperature of the moving object M1 in the object temperature-measuring range R1 so as to obtain a measured object temperature (i.e., an estimated temperature obtained by measuring), and the measured object temperature that is captured from the moving object M1 is substantially close to or greater than an actual object temperature of the moving object M1 (i.e., an actual temperature of the moving object M1). That is to say, as shown in FIG. 1, when the social distance D2 from the moving object M1 to the adjacent moving object M3 is smaller than to the predetermined distance setting value, the actual object temperature of the moving object M1 can be affected by an actual object temperature of the adjacent moving object M3, so that the measured object temperature that is captured from the moving object M1 is substantially greater than the actual object temperature of the moving object M1 (for example, when the actual object temperature of the adjacent moving object M3 is too high, the measured object temperature that is captured from the moving object M1 is substantially greater than the actual object temperature of the moving object MD. However, the aforementioned description is merely an example, and is not meant to limit the scope of the present disclosure.

Second Embodiment

Figure 3:
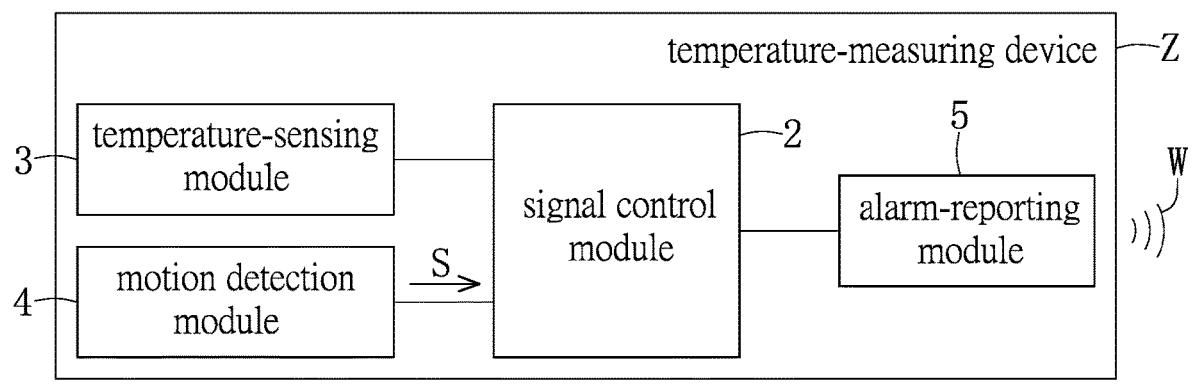
FIG. 3 is a functional block diagram of a temperature-measuring device for detecting moving object trajectories according to a second embodiment of the present disclosure.

Referring to FIG. 1 and FIG. 3, a second embodiment of the present disclosure provides a temperature-measuring device Z for detecting moving object trajectories, which includes a device main body 1, a signal control module 2, a temperature-sensing module 3 and a motion detection module 4. Comparing FIG. 3 with FIG. 2, the main difference between the second embodiment and the first embodiment is as follows: in the second embodiment, the temperature-measuring device Z further includes an alarm-reporting module 5 that is disposed on the device main body 1 and electrically connected to the signal control module 2 for generating an alarm signal W.

For example, referring to FIG. 1 and FIG. 3, when the motion trajectory T of the moving object M1 is outside of the object temperature-measuring range R1 (such as a middle position of the motion trajectory T of the moving object M1 indicated by the dash-dotted line in FIG. 1), the signal control module 2 can be configured to transmit a detection signal S that is provided by the motion detection module 4 to the alarm-reporting module 5, and the alarm-reporting module 5 can be configured to generate the alarm signal W (such as a sound alarm signal) to relevant personnel according to the detection signal S. However, the aforementioned description is merely an example, and is not meant to limit the scope of the present disclosure.

Third Embodiment

Figure 4:
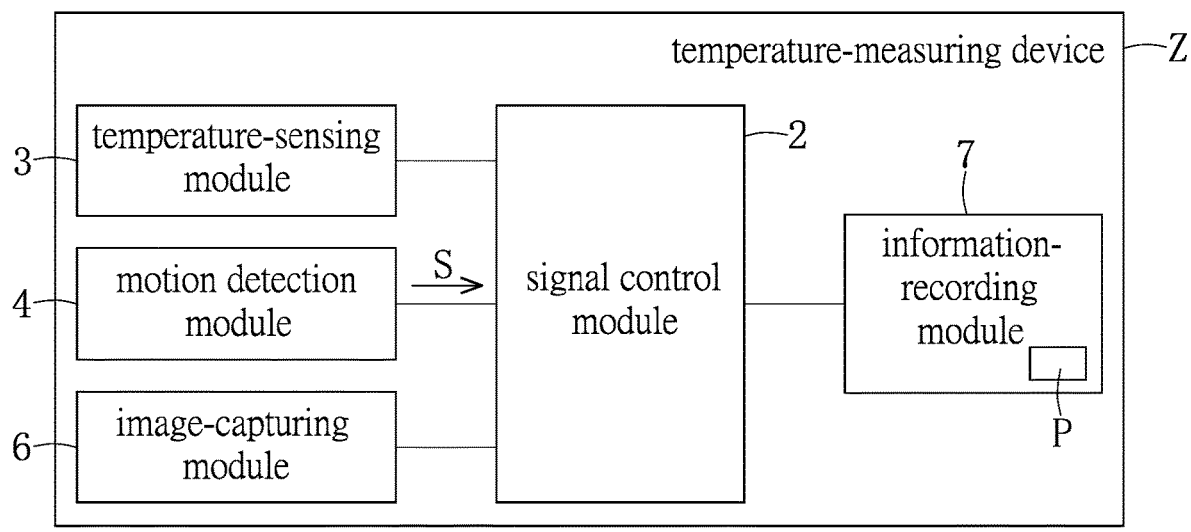
FIG. 4 is a functional block diagram of a temperature-measuring device for detecting moving object trajectories according to a third embodiment of the present disclosure.

Referring to FIG. 1 and FIG. 4, a third embodiment of the present disclosure provides a temperature-measuring device Z for detecting moving object trajectories, which includes a device main body 1, a signal control module 2, a temperature-sensing module 3 and a motion detection module 4. Comparing FIG. 4 with FIG. 2, the main difference between the third embodiment and the first embodiment is as follows: in the third embodiment, the temperature-measuring device Z further includes an image-capturing module 6 and an information-recording module 7. More particularly, the image-capturing module 6 is disposed on the device main body 1 and electrically connected to the signal control module 2 for capturing image information of each of the moving objects M, and the information-recording module 7 is disposed on the device main body 1 and electrically connected to the signal control module 2 for recording object-related information P (such as person-related information) of each of the moving objects M.

For example, referring to FIG. 1 and FIG. 4, the image-capturing module 6 can be a charge coupled device (CCD) sensor, or a complementary metal oxide semiconductor (CMOS) sensor. In addition, when the motion trajectory T of the moving object M1 is outside of the object temperature-measuring range R1 (such as a middle position of the motion trajectory T of the moving object M1 indicated by the dash-dotted line in FIG. 1), the signal control module 2 can be configured to transmit a detection signal S provided by the motion detection module 4 to the information-recording module 7, and the information-recording module 7 can be configured to record the object-related information P (such as person-related information including image information and temperature information) of each of the moving objects M according to the detection signal S. However, the aforementioned description is merely an example, and is not meant to limit the scope of the present disclosure.

Fourth Embodiment

Figure 5:
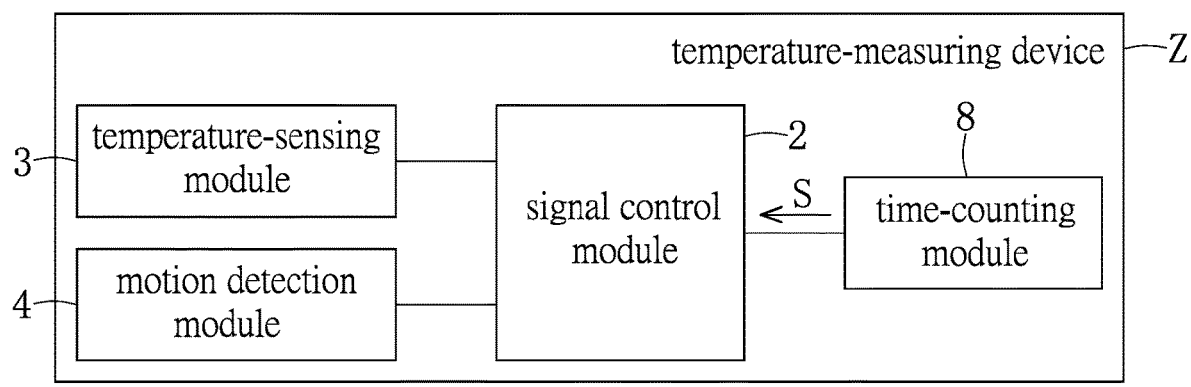
FIG. 5 is a functional block diagram of a temperature-measuring device for detecting moving object trajectories according to a fourth embodiment of the present disclosure.

Referring to FIG. 1 and FIG. 5, a fourth embodiment of the present disclosure provides a temperature-measuring device Z for detecting moving object trajectories, which includes a device main body 1, a signal control module 2, a temperature-sensing module 3 and a motion detection module 4. Comparing FIG. 5 with FIG. 2, the main difference between the fourth embodiment and the first embodiment is as follows: in the fourth embodiment, the temperature-measuring device Z further includes a time-counting module 8 (such as a timing module) that is disposed on the device main body 1 and electrically connected to the signal control module 2 for calculating a stay time of each of the moving objects M in the object motion detection range R2.

For example, referring to FIG. 1 and FIG. 5, when the stay time of the moving object M in the object motion detection range R2 exceed a predetermined time setting value (or in response to the stay time of the moving object M in the object motion detection range R2 exceeding a predetermined time setting value), the temperature-sensing module 3 can be configured to start measuring the temperature of the moving object M in the object temperature-measuring range R1 so as to obtain a measured object temperature. In addition, when the stay time of the moving object M in the object motion detection range R2 does not exceed a predetermined time setting value (or in response to the stay time of the moving object M in the object motion detection range R2 not exceeding a predetermined time setting value), the temperature-sensing module 3 can be configured to stop measuring the temperature of the moving object M in the object temperature-measuring range R1. That is to say, a temperature of an outdoor region can affect an actual object temperature of the moving object M, so that when the moving object M moves from the outdoor area to an indoor area, the moving object M should stay for a sufficient period of time (such as staying for 30 seconds in the object temperature-measuring range R1) in the indoor area, so as to enable the measured object temperature of the moving object M to be accurately captured.

Fifth Embodiment

Figure 6:
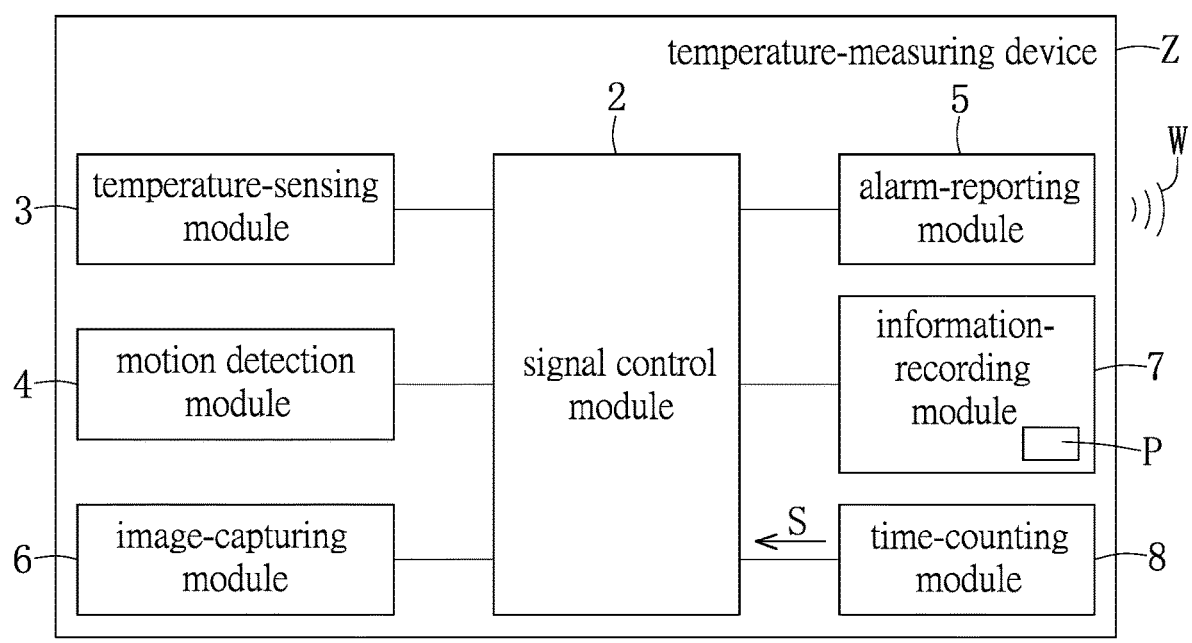
FIG. 6 is a functional block diagram of a temperature-measuring device for detecting moving object trajectories according to a fifth embodiment of the present disclosure.

Referring to FIG. 1 and FIG. 6, a fifth embodiment of the present disclosure provides a temperature-measuring device Z for detecting moving object trajectories, which includes a device main body 1, a signal control module 2, a temperature-sensing module 3 and a motion detection module 4. Comparing FIG. 6 with FIG. 2, the main difference between the fifth embodiment and the first embodiment is as follows: in the fifth embodiment, the temperature-measuring device Z further includes an alarm-reporting module 5, an image-capturing module 6, an information-recording module 7 and a time-counting module 8. In addition, the alarm-reporting module 5 is disposed on the device main body 1 and electrically connected to the signal control module 2 for generating an alarm signal W. The image-capturing module 6 is disposed on the device main body 1 and electrically connected to the signal control module 2 for capturing image information of each of the moving objects M. The information-recording module 7 is disposed on the device main body 1 and electrically connected to the signal control module 2 for recording object-related information P (such as person-related information) of each of the moving objects M. The time-counting module 8 is disposed on the device main body 1 and electrically connected to the signal control module 2 for calculating a stay time of each of the moving objects M in the object motion detection range R2.

It should be noted that, for example, referring to FIG. 1 and FIG. 6, when the stay time of the moving object M in the object motion detection range R2 does not exceed a predetermined time setting value (or in response to the stay time of the moving object M in the object motion detection range R2 exceeding a predetermined time setting value), the signal control module 2 can be configured to transmit a detection signal S that is provided by the time-counting module 8 to the alarm-reporting module 5, and the alarm-reporting module 5 can be configured to generate the alarm signal W (such as a sound alarm signal) to relevant personnel according to the detection signal S. However, the aforementioned description is merely an example, and is not meant to limit the scope of the present disclosure.

Beneficial Effects of the Embodiments

In conclusion, in the temperature-measuring device Z provided by the present disclosure, by virtue of "the temperature-sensing module 3 being electrically connected to the signal control module 2 for measuring a temperature of each of a plurality of moving objects M in an object temperature-measuring range R1", "the motion detection module 4 being electrically connected to the signal control module 2 for capturing a motion trajectory T (or a motion trajectory T and a social distance D) of each of the moving objects M in an object motion detection range R2" and "the object temperature-measuring range R1 being smaller than or equal to the object motion detection range R2, and the object temperature-measuring range R1 falling entirely within the object motion detection range R2", the temperature-sensing module 3 can be configured to respectively measure the temperatures of all of the moving objects M in the object temperature-measuring range R1 according to information of the motion trajectories T of the moving objects M (or information of the motion trajectories T and the social distances D of the moving objects M) that are provided by the motion detection module 4.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A temperature-measuring device for detecting moving object trajectories, comprising:
    a device main body;
    a signal control module disposed on the device main body;
    a temperature-sensing module disposed on the device main body and electrically connected to the signal control module, for measuring a temperature of each of a plurality of moving objects in an object temperature-measuring range; and
    a motion detection module disposed on the device main body and electrically connected to the signal control module, for capturing a motion trajectory of each of the moving objects and a social distance of each of the moving objects from an adjacent one of the moving objects in an object motion detection range;
    wherein the object temperature-measuring range is smaller than or equal to the object motion detection range, and the object temperature-measuring range falls entirely within the object motion detection range.

2. The temperature-measuring device according to claim 1,
    wherein, when the motion trajectory of the moving object is in the object temperature-measuring range, and the social distance of the moving object from the adjacent moving object is greater than or equal to a predetermined distance setting value, the temperature-sensing module is configured to measure the temperature of the moving object in the object temperature-measuring range so as to obtain a measured object temperature, and the measured object temperature that is captured from the moving object is close to an actual object temperature of the moving object;
    wherein the predetermined distance setting value is a separation distance for preventing the actual object temperature of the moving object from being affected by an actual object temperature of the adjacent moving object.

3. The temperature-measuring device according to claim 1,
wherein, when the motion trajectory of the moving object is in the object temperature-measuring range, and the social distance of the moving object from the adjacent moving object is smaller than a predetermined distance setting value, the temperature-sensing module is configured to measure the temperature of the moving object in the object temperature-measuring range so as to obtain a measured object temperature, and the measured object temperature that is captured from the moving object is close to or greater than an actual object temperature of the moving object;
wherein the predetermined distance setting value is a separation distance for preventing the actual object temperature of the moving object from being affected by an actual object temperature of the adjacent moving object.

4. The temperature-measuring device according to claim 1, further comprising:
an alarm-reporting module disposed on the device main body and electrically connected to the signal control module, for generating an alarm signal;
wherein, when the motion trajectory of the moving object is outside of the object temperature-measuring range, the signal control module is configured to transmit a detection signal provided by the motion detection module to the alarm-reporting module, and the alarm-reporting module is configured to generate the alarm signal according to the detection signal.

5. The temperature-measuring device according to claim 1, further comprising:
an image-capturing module disposed on the device main body and electrically connected to the signal control module, for capturing image information of each of the moving objects; and
an information-recording module disposed on the device main body and electrically connected to the signal control module, for recording object-related information of each of the moving objects;
wherein, when the motion trajectory of the moving object is outside of the object temperature-measuring range, the signal control module is configured to transmit a detection signal provided by the motion detection module to the information-recording module, and the information-recording module is configured to record the object-related information of each of the moving objects according to the detection signal.

6. The temperature-measuring device according to claim 1, further comprising:
a time-counting module disposed on the device main body and electrically connected to the signal control module, for calculating a stay time of each of the moving objects in the object motion detection range;
wherein, in response to the stay time of the moving object in the object motion detection range exceeding a predetermined time setting value, the temperature-sensing module is configured to start measuring the temperature of the moving object in the object temperature-measuring range so as to obtain a measured object temperature.

7. The temperature-measuring device according to claim 1, further comprising:
a time-counting module disposed on the device main body and electrically connected to the signal control module, for calculating a stay time of each of the moving objects in the object motion detection range;
wherein, in response to the stay time of the moving object in the object motion detection range not exceeding a predetermined time setting value, the temperature-sensing module is configured to stop measuring the temperature of the moving object in the object temperature-measuring range.

8. A temperature-measuring device for detecting moving object trajectories, comprising:
a signal control module;
a temperature-sensing module electrically connected to the signal control module, for measuring a temperature of each of a plurality of moving objects in an object temperature-measuring range; and
a motion detection module electrically connected to the signal control module, for capturing a motion trajectory of each of the moving objects in an object motion detection range;
wherein the object temperature-measuring range is smaller than or equal to the object motion detection range, and the object temperature-measuring range falls entirely within the object motion detection range.

9. A temperature-measuring device for detecting moving object trajectories, comprising:
a device main body;
a signal control module disposed on the device main body;
a temperature-sensing module disposed on the device main body and electrically connected to the signal control module, for measuring a temperature of each of a plurality of moving objects in an object temperature-measuring range;
a motion detection module disposed on the device main body and electrically connected to the signal control module, for capturing a motion trajectory of each of the moving objects and a social distance of each of the moving objects from an adjacent one of the moving objects in an object motion detection range;
an alarm-reporting module disposed on the device main body and electrically connected to the signal control module, for generating an alarm signal;
an image-capturing module disposed on the device main body and electrically connected to the signal control module, for capturing image information of each of the moving objects;
an information-recording module disposed on the device main body and electrically connected to the signal control module, for recording object-related information of each of the moving objects; and
a time-counting module disposed on the device main body and electrically connected to the signal control module, for calculating a stay time of each of the moving objects in the object motion detection range;
wherein the object temperature-measuring range is smaller than or equal to the object motion detection range, and the object temperature-measuring range falls entirely within the object motion detection range.

10. The temperature-measuring device according to claim 9,
wherein, when the motion trajectory of the moving object is outside of the object temperature-measuring range, the signal control module is configured to transmit a detection signal provided by the motion detection module to the alarm-reporting module, and the alarm-reporting module is configured to generate the alarm signal according to the detection signal;
wherein, when the motion trajectory of the moving object is outside of the object temperature-measuring range, the signal control module is configured to transmit the detection signal provided by the motion detection module to the information-recording module, and the information-recording module is configured to record the object-related information of each of the moving objects according to the detection signal;

wherein, in response to the stay time of the moving object in the object motion detection range exceeding a predetermined time setting value, the temperature-sensing module is configured to start measuring the temperature of the moving object in the object temperature-measuring range so as to obtain a measured object temperature;

wherein, in response to the stay time of the moving object in the object motion detection range not exceeding the predetermined time setting value, the temperature-sensing module is configured to stop measuring the temperature of the moving object in the object temperature-measuring range.

* * * * *